(12) United States Patent
Araki

(10) Patent No.: US 10,120,178 B2
(45) Date of Patent: Nov. 6, 2018

(54) VIBRATION DRIVE DEVICE IN WHICH SEPARATION BETWEEN MEMBERS BY EXTERNAL FORCE IS SUPPRESSED, LENS BARREL, IMAGE PICKUP APPARATUS, AND STAGE DEVICE

(71) Applicant: CANON KABUSHIKI KAISHA, Tokyo (JP)

(72) Inventor: Yasuyuki Araki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 115 days.

(21) Appl. No.: 14/918,921

(22) Filed: Oct. 21, 2015

(65) Prior Publication Data

US 2016/0126864 A1   May 5, 2016

(30) Foreign Application Priority Data

Oct. 29, 2014 (JP) ................. 2014-220203

(51) Int. Cl.
| | |
|---|---|
| *G02B 27/64* | (2006.01) |
| *G02B 21/26* | (2006.01) |
| *H02N 2/00* | (2006.01) |
| *H02N 2/10* | (2006.01) |
| *G02B 7/09* | (2006.01) |
| *G02B 7/10* | (2006.01) |

(52) U.S. Cl.
CPC ............ *G02B 21/26* (2013.01); *G02B 7/09* (2013.01); *G02B 7/10* (2013.01); *G02B 27/646* (2013.01); *H02N 2/006* (2013.01); *H02N 2/0015* (2013.01); *H02N 2/103* (2013.01)

(58) Field of Classification Search
CPC . G02B 7/28; G02B 7/282; G02B 7/02; G02B 7/021; G02B 7/04; G02B 7/09; G03B 13/32; G03B 13/34; G03B 13/36; G03B 3/00; G03B 3/10; G03B 3/12
USPC ..... 359/393, 554, 557, 379, 368; 250/201.2, 250/201.3, 201.4
See application file for complete search history.

(56) References Cited

U.S. PATENT DOCUMENTS

| | | | |
|---|---|---|---|
| 8,816,568 B2 | 8/2014 | Seki et al. | |
| 2013/0193803 A1* | 8/2013 | Yamasaki | H02N 2/103 310/323.16 |
| 2014/0319966 A1 | 10/2014 | Seki et al. | |

(Continued)

FOREIGN PATENT DOCUMENTS

JP    2012-005309 A    1/2012

*Primary Examiner* — Arnel C Lavarias
(74) *Attorney, Agent, or Firm* — Fitzpatrick, Cella, Harper & Scinto

(57) ABSTRACT

A vibration drive device can suppress separation between members thereof when an external force is applied thereto. The vibration drive device excites vibration in a vibrating body to move the vibrating body and a driven body relative to each other. The vibrating body has a piezoelectric element joined to a first surface of an elastic body. Protrusions for pressure contact with the driven body are formed on a second surface of the elastic body. The elastic body is supported by support plates, and the support plates are held on a base. An equalizing stage is disposed on a side facing the first surface of the elastic body. A vibration damping member disposed between the vibrating body and the equalizing stage suppresses transmission of vibration from the vibrating body to the equalizing stage.

24 Claims, 8 Drawing Sheets

(56) References Cited

U.S. PATENT DOCUMENTS

2015/0137663 A1* 5/2015 Kimura .................. H02N 2/026
                                                                310/323.02

* cited by examiner

MODE A

MODE B

VIBRATION DRIVE DEVICE IN WHICH SEPARATION BETWEEN MEMBERS BY EXTERNAL FORCE IS SUPPRESSED, LENS BARREL, IMAGE PICKUP APPARATUS, AND STAGE DEVICE

BACKGROUND OF THE INVENTION

Field of the Invention

The present invention relates to a vibration drive device (vibration actuator) that brings a vibrating body and a driven body into pressure contact with each other and causes the vibrating body and the driven body to be moved relative to each other by vibration excited in the vibrating body, and a lens barrel, an image pickup apparatus, and a stage device each provided with the vibration drive device.

Description of the Related Art

There has been known a vibration drive device that brings a driven body into pressure contact with a vibrating body formed by joining an electromechanical energy conversion element to an elastic body and excites a predetermined vibration in the vibrating body by applying an alternating current (AC) signal to the electromechanical energy conversion element, to thereby move the vibrating body and the driven body relative to each other. For example, there has been known a vibrating body that has a piezoelectric element, which is an electromechanical energy conversion element, bonded onto a first surface of a plate-shaped elastic body, and two protrusions formed on a second surface of the elastic body opposite from the first surface, with a predetermined spacing therebetween. In this vibrating body, each of the protrusions is caused to perform elliptic motion in a plane including a direction connecting between the two protrusions and a direction of thickness of the elastic body, and the driven body is brought into pressure contact with the tops of the respective protrusions, whereby the driven body is driven in the direction connecting between the two protrusions as a driving direction.

Further, as a vibration drive device using a vibrating body of the above-described type, there has been proposed one which has a single or a plurality of vibrating bodies disposed on an annular support base such that a driving direction coincides with a tangent direction, and is configured to bring an annular driven body into pressure contact with the one or plurality of vibrating bodies to thereby drivingly rotate the driven body (see Japanese Patent Laid-Open Publication No. 2012-5309).

In the vibration drive device using the above-described vibrating body or bodies, however, when an external force such as drop impact is applied to any vibrating body, a pressure application force acting between the vibrating body and the driven body increases to largely bend the vibrating body, which can cause undesired separation between the elastic body and the piezoelectric element bonded thereto.

SUMMARY OF THE INVENTION

The present invention provides a technique for a vibration drive device, which makes it possible to suppress separation that can occur between an elastic body and an electromechanical energy conversion element when an external force, such as an impact, is applied to a vibrating body including the elastic body and the electromechanical energy conversion element.

In a first aspect of the invention, there is provided a vibration drive device that includes a vibrating body including an electromechanical energy conversion element and an elastic body having a first surface to which is joined the electromechanical energy conversion element and a second surface opposite from the first surface, on which protrusions are provided, and a driven body in pressure contact with the protrusions, and is configured to excite vibration in the vibrating body to thereby move the vibrating body and the driven body relative to each other, the vibration drive device comprising support plates configured to support the elastic body, a base configured to hold the support plates, an equalizing stage disposed on a side facing the first surface of the elastic body held on the base via the support plates, and a vibration damping member disposed between the vibrating body and the equalizing stage and configured to suppress transmission of vibration of the vibrating body to the equalizing stage, wherein the equalizing stage receives, from the first surface of the vibrating body, a pressure application force applied to the vibrating body via the vibration damping member, and thereby equalizes a pressure application force applied from the vibrating body to the driven body, and wherein a length of the vibration damping member is shorter than a length of the vibrating body in a direction orthogonal to a driving direction in which the vibrating body and the driven body are moved relative to each other, and also to a pressure application direction between the vibrating body and the driven body.

In a second aspect of the invention, there is provided a vibration drive device that includes a vibrating body including an electromechanical energy conversion element and an elastic body having a first surface to which is joined the electromechanical energy conversion element and a second surface opposite from the first surface, on which protrusions are provided, and a driven body in pressure contact with the protrusions, and is configured to excite vibration in the vibrating body to thereby move the vibrating body and the driven body relative to each other, the vibration drive device comprising support plates configured to support the elastic body, a base configured to hold the support plates, and a warpage suppression unit disposed on a side facing the first surface of the elastic body held on the base via the support plates, so as to suppress warpage occurring in a case where an external force acts on the vibrating body.

In a third aspect of the invention, there is provided a lens barrel comprising a lens; and a vibration drive device for moving the lens in an optical axis direction, the vibration drive device including a vibrating body including an electromechanical energy conversion element and an elastic body having a first surface to which is joined the electromechanical energy conversion element and a second surface opposite from the first surface, on which protrusions are provided, and a driven body in pressure contact with the protrusions, and is configured to excite vibration in the vibrating body to thereby move the vibrating body and the driven body relative to each other, wherein the vibration drive device includes support plates configured to support the elastic body, a base configured to hold the support plates, an equalizing stage disposed on a side facing the first surface of the elastic body held on the base via the support plates, and a vibration damping member disposed between the vibrating body and the equalizing stage and configured to suppress transmission of vibration of the vibrating body to the equalizing stage, wherein the equalizing stage receives, from the first surface of the vibrating body, a pressure application force applied to the vibrating body via the vibration damping member, and thereby equalizes a pressure application force applied from the vibrating body to the driven body, and wherein a length of the vibration damping member is shorter than a length of the vibrating body in a direction orthogonal to a driving direction in which the vibrating body and the driven body are moved relative to each other, and also to a pressure application direction between the vibrating body and the driven body.

In a fourth aspect of the invention, there is provided a lens barrel comprising a lens for image blur correction, and a vibration drive device for moving the lens within a plane orthogonal to an optical axis direction, the vibration drive device including a vibrating body including an electromechanical energy conversion element and an elastic body having a first surface to which is joined the electromechanical energy conversion element and a second surface opposite from the first surface, on which protrusions are provided, and a driven body in pressure contact with the protrusions, and is configured to excite vibration in the vibrating body to thereby move the vibrating body and the driven body relative to each other, wherein the vibration drive device includes support plates configured to support the elastic body, a base configured to hold the support plates, an equalizing stage disposed on a side facing the first surface of the elastic body held on the base via the support plates, and a vibration damping member disposed between the vibrating body and the equalizing stage and configured to suppress transmission of vibration of the vibrating body to the equalizing stage, wherein the equalizing stage receives, from the first surface of the vibrating body, a pressure application force applied to the vibrating body via the vibration damping member, and thereby equalizes a pressure application force applied from the vibrating body to the driven body, and wherein a length of the vibration damping member is shorter than a length of the vibrating body in a direction orthogonal to a driving direction in which the vibrating body and the driven body are moved relative to each other, and also to a pressure application direction between the vibrating body and the driven body.

In a fifth aspect of the invention, there is provided an image pickup apparatus comprising a lens barrel, an image pickup element for converting an optical image formed by light passing through the lens barrel, and a vibration drive device for moving the lens in an optical axis direction, the vibration drive device including a vibrating body including an electromechanical energy conversion element and an elastic body having a first surface to which is joined the electromechanical energy conversion element and a second surface opposite from the first surface, on which protrusions are provided, and a driven body in pressure contact with the protrusions, and is configured to excite vibration in the vibrating body to thereby move the vibrating body and the driven body relative to each other, wherein the vibration drive device includes support plates configured to support the elastic body, a base configured to hold the support plates, an equalizing stage disposed on a side facing the first surface of the elastic body held on the base via the support plates, and a vibration damping member disposed between the vibrating body and the equalizing stage and configured to suppress transmission of vibration of the vibrating body to the equalizing stage, wherein the equalizing stage receives, from the first surface of the vibrating body, a pressure application force applied to the vibrating body via the vibration damping member, and thereby equalizes a pressure application force applied from the vibrating body to the driven body, and wherein a length of the vibration damping member is shorter than a length of the vibrating body in a direction orthogonal to a driving direction in which the vibrating body and the driven body are moved relative to each other, and also to a pressure application direction between the vibrating body and the driven body.

In a sixth aspect of the invention, there is provided an image pickup apparatus comprising a lens barrel, an image pickup element for converting an optical image formed by light passing through the lens barrel, and a vibration drive device for moving the lens within a plane orthogonal to an optical axis direction, to thereby correct image blur of an optical image formed on the image pickup element, the vibration drive device including a vibrating body including an electromechanical energy conversion element and an elastic body having a first surface to which is joined the electromechanical energy conversion element and a second surface opposite from the first surface, on which protrusions are provided, and a driven body in pressure contact with the protrusions, and is configured to excite vibration in the vibrating body to thereby move the vibrating body and the driven body relative to each other, wherein the vibration drive device includes support plates configured to support the elastic body, a base configured to hold the support plates, an equalizing stage disposed on a side facing the first surface of the elastic body held on the base via the support plates, and a vibration damping member disposed between the vibrating body and the equalizing stage and configured to suppress transmission of vibration of the vibrating body to the equalizing stage, wherein the equalizing stage receives, from the first surface of the vibrating body, a pressure application force applied to the vibrating body via the vibration damping member, and thereby equalizes a pressure application force applied from the vibrating body to the driven body, and wherein a length of the vibration damping member is shorter than a length of the vibrating body in a direction orthogonal to a driving direction in which the vibrating body and the driven body are moved relative to each other, and also to a pressure application direction between the vibrating body and the driven body.

In a seventh aspect of the invention, there is provided a stage device comprising a stage, and a vibration drive device for moving the stage within a plane of the stage, the vibration drive device including a vibrating body including an electromechanical energy conversion element and an elastic body having a first surface to which is joined the electromechanical energy conversion element and a second surface opposite from the first surface, on which protrusions are provided, and a driven body in pressure contact with the protrusions, and is configured to excite vibration in the vibrating body to thereby move the vibrating body and the driven body relative to each other, wherein the vibration drive device includes support plates configured to support the elastic body, a base configured to hold the support plates, an equalizing stage disposed on a side facing the first surface of the elastic body held on the base via the support plates, and a vibration damping member disposed between the vibrating body and the equalizing stage and configured to suppress transmission of vibration of the vibrating body to the equalizing stage, wherein the equalizing stage receives, from the first surface of the vibrating body, a pressure application force applied to the vibrating body via the vibration damping member, and thereby equalizes a pressure application force applied from the vibrating body to the driven body, and wherein a length of the vibration damping member is shorter than a length of the vibrating body in a direction orthogonal to a driving direction in which the vibrating body and the driven body are moved relative to each other, and also to a pressure application direction between the vibrating body and the driven body.

According to the invention, it is possible to suppress separation that can occur between the elastic body and the electromechanical energy conversion element when an external force, such as an impact, is applied to the vibrating body.

Further features of the present invention will become apparent from the following description of exemplary embodiments (with reference to the attached drawings).

DESCRIPTION OF THE EMBODIMENTS

The present invention will now be described in detail below with reference to the accompanying drawings showing an embodiment thereof.

Figure 1A:
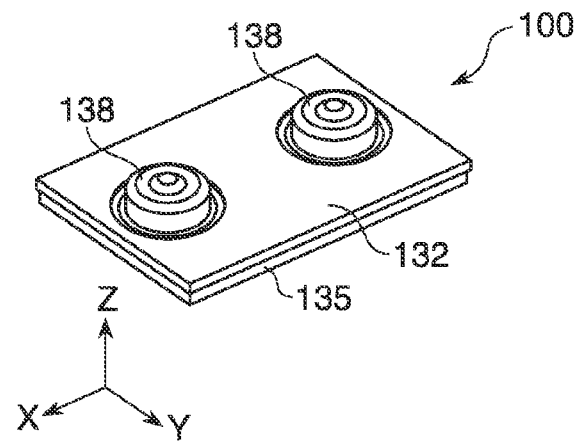
FIG. 1A is a perspective view of a vibrating body as a component of a vibration drive device according to an embodiment of the present invention.

FIG. 1A is a perspective view of a vibrating body 100 as a component of a vibration drive device according to the embodiment of the present invention. The vibrating body 100 is comprised of a plate-shaped elastic body 132, a piezoelectric element 135 which is a plate-shaped electromechanical energy conversion element joined (bonded) to a first surface of the elastic body 132, which surface extends orthogonally to the thickness direction of the elastic body 132, and two protrusions 138 protruding in the thickness direction from a second surface of the elastic body 132 opposite from the first surface. Now, it is assumed that a three-dimensional orthogonal coordinate system is set, as shown in FIG. 1A, in which the thickness direction of the elastic body 132 is set as a Z direction, a direction connecting between the two protrusions 138 is set as an X direction, and a direction orthogonal to both the X direction and the Z direction is set as a Y direction, and this three-dimensional orthogonal coordinate system will be used in the following description as required.

Figure 1B:
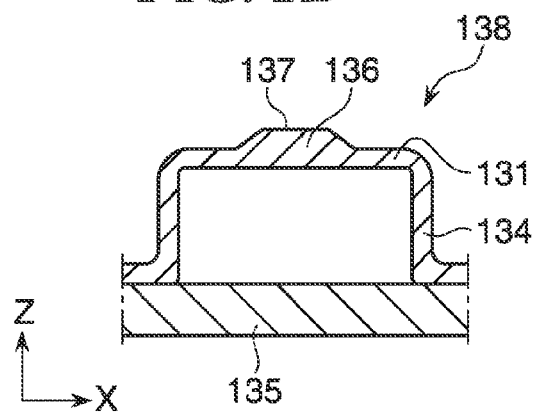
FIG. 1B is a cross-sectional view of the vibrating body shown in FIG. 1A.

FIG. 1B is a schematic cross-sectional view of the protrusion 138. The two protrusions 138 are formed integrally with the elastic body 132 e.g. by pressing the elastic body 132, which has a plate shape, made of a metal. However, this is not limitative, but the protrusions 138 may be joined to the upper surface of the elastic body 132 e.g. by laser welding. It is only required that the two protrusions 138 have respective shapes which can be regarded as substantially the same, by taking processing accuracy and the like into consideration.

Each of the protrusions 138 is comprised of a contact portion 136 having a contact surface 137 for contact with a driven body 207, not shown in FIG. 1B, (see FIG. 3A), an erect wall portion 134 protruding toward an opposite side from the piezoelectric element 135, and a connection portion 131 that connects the erect wall portion 134 and the contact portion 136. The erect wall portion 134 has a hollow cylindrical shape in the illustrated example, but this is not limitative. The erect wall portion 134 is continuous all along the circumference of the protrusion 138, and hence the rigidity of the protrusion 138 is high in an in-plane direction of an X-Y plane. Therefore, even when the protrusion 138 receives a reaction force in the X direction from the driven body 207 during driving of the same, deformation of the protrusion 138 is minimized. Note that the contact portion 136 is formed in a manner protruding upward from the connection portion 131, whereby a gap is formed between the connection portion 131 and the driven body 207. This prevents the driven body 207 and the connection portion 131 from abutting each other.

Figure 1C:
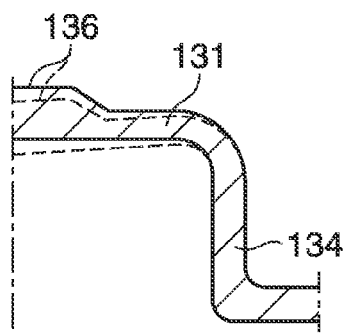
FIG. 1C is a enlarged partial cross-sectional view of a protrusion of the vibrating body shown in FIG. 1B.

FIG. 1C is an enlarged partial cross-sectional view of the protrusion 138. When the connection portion 136 is pressed toward the piezoelectric element 135, the contact portion 136 and the connection portion 131 are deformed using the boundary between the erect wall portion 134 and the connection portion 131 as a support. In FIG. 1C, the contact portion 136 and the connection portion 131 in a deformed state are depicted in broken lines. The vibrating body 100 is designed such that rigidity thereof in the Z direction is reduced by reducing the thickness of the connection portion 131, whereby the protrusion 138 has a spring property of being resilient with respect to the elastic body 132 in the Z direction. The contact portion 136 also has a spring property of being bent and deformed under pressure.

If the rigidity of the protrusion 138 is high, tapping noise is made when the protrusion 138 is brought into contact with the driven body 207, not shown in FIG. 1C, whereas if the rigidity of the protrusion 138 is low, the protrusion 138 is deformed during frictional driving of the driven body 207, not shown in FIG. 1C, which causes degradation of driving efficiency. Therefore, the thickness of the contact portion 136 and that of the connection portion 131 are set to respective appropriate values so as to prevent generation of noise during driving of the vibrating body 100 and also prevent degradation of driving efficiency.

Figure 2A:
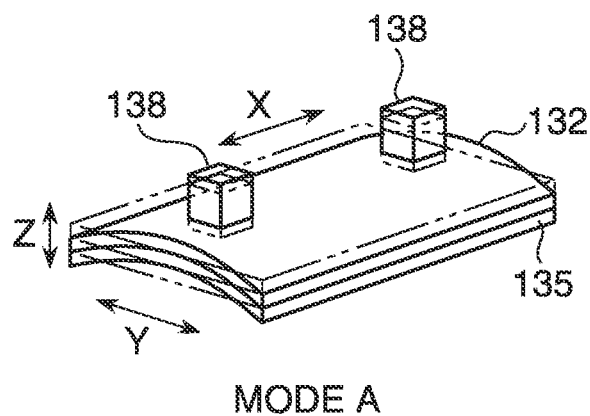
FIGS. 2A and 2B are views useful in explaining vibration modes in which vibration is excited in the vibrating body in FIG. 1A.
Figure 2B:
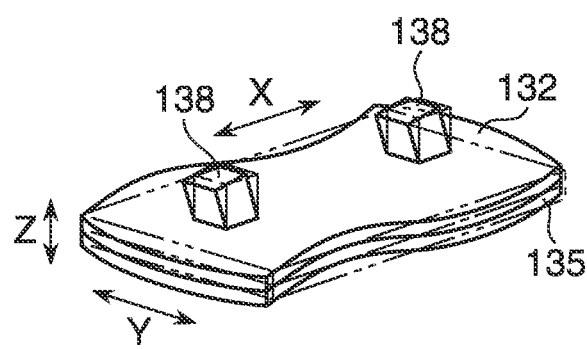

Vibration of the vibrating body 100 is excited by applying an AC voltage to the piezoelectric element 135 via a flexible printed circuit board (FPC) 146, not shown in FIG. 1C, (see FIG. 6), which is attached to the piezoelectric element 135 as an electromechanical conversion element, such that the vibrating body 100 is excited in a plurality of bending vibration modes. In the present example, the vibrating body 100 is excited in two bending vibration modes. FIG. 2A is a view useful in explaining a first vibration mode (hereinafter referred to as "the mode A") in which the vibrating body 100 is excited, and FIG. 2B is a view useful in explaining a second vibration mode (hereinafter referred to as "the mode B") in which the vibrating body 100 is excited. Note that in FIGS. 2A and 2B, each of the protrusions 138 is depicted as a rectangular parallelepiped in a simplified manner.

A vibration in the mode A shown in FIG. 2A is a primary out-of-plane bending vibration having two nodal lines that appear in the vibrating body 100 in a direction parallel to the X direction connecting between the two protrusions 138. A vibration in the mode B shown in FIG. 2B is a secondary out-of-plane bending vibration having three nodal lines that appear in the vibrating body 100 in a direction parallel to the Y direction which is orthogonal to both the X direction and the Z direction which is the thickness direction of the elastic body 132. Each of the protrusions 138 is provided close to a location of a loop of the vibration in the mode A and also close to a node of the vibration in the mode B. For this reason, the top of the protrusion 138 reciprocates in the X direction while performing pendulum motion using the node of the vibration in the mode B as a support and also reciprocates in the Z direction in accordance with the vibration in the mode A.

Therefore, by simultaneously exciting the vibrations in the respective modes A and B such that a phase difference therebetween becomes approximately equal to $\pm\pi/2$ and then superposing the vibrations upon each other, it is possible to cause the top of the protrusion 138 to perform elliptic motion within an X-Z plane. A frictional force generated by pressure contact acts between the protrusions 138 and the driven body 207, not shown in FIGS. 2A and 2B, so that a driving force (thrust) for driving the driven body 207 in the X direction relative to the vibrating body 100 can be generated by the elliptic motion of the protrusions 138.

Next, a description will be given of a drive unit 150 as an example of the vibration drive device using the vibrating bodies 100, and a lens barrel unit 200 provided with the drive unit 150.

Figure 3A:
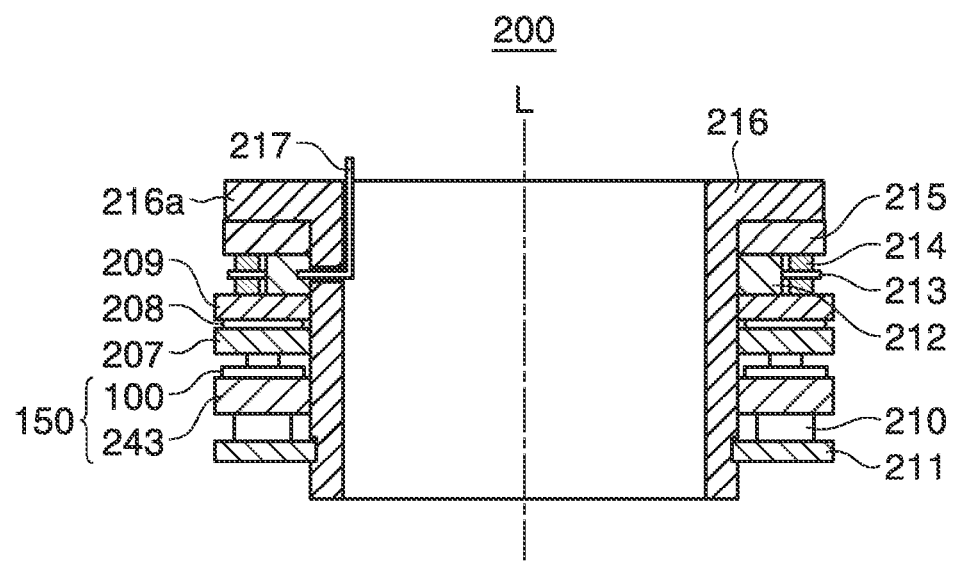
FIG. 3A is a schematic cross-sectional view of a lens barrel unit as an example of the vibration drive device according to the embodiment.
Figure 3B:
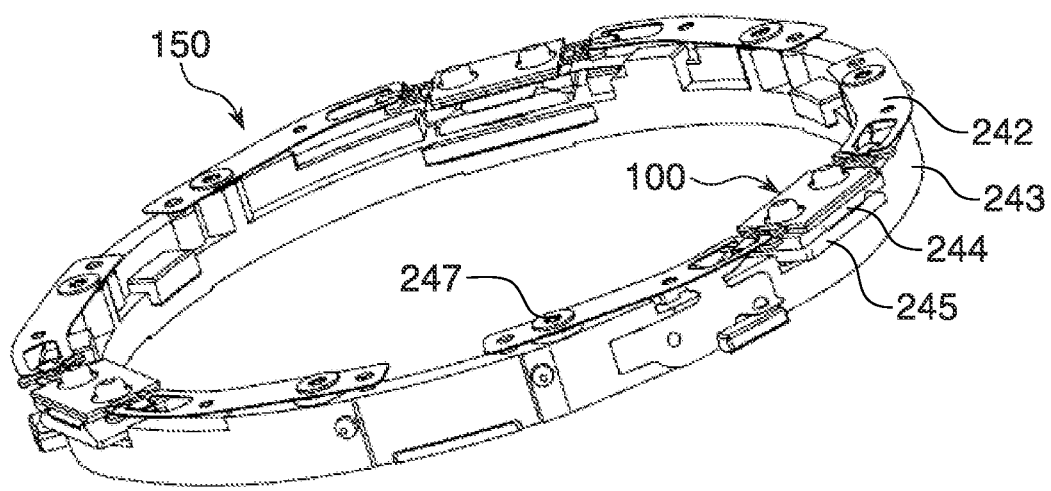
FIG. 3B is a perspective view of a drive unit as a component of the lens barrel unit shown in FIG. 3A.

FIG. 3A is a schematic cross-sectional view of the lens barrel unit 200 according to the present embodiment, and FIG. 3B is a perspective view of the drive unit 150 as a component of the lens barrel unit 200. The lens barrel unit 200 includes an output key 217, a lens barrel unit body 216, a manual ring 215, rollers 214, roller shafts 213, and a roller ring 212. Further, the lens barrel unit 200 includes a pressure ring 211, a leaf spring 210, an output transmission member 209, a rotor rubber 208, a driven body 207, and the drive unit 150, and the drive unit 150 is comprised of the vibrating bodies 100 and a base 243.

The driven body 207, which has an annular shape, is disposed in a state rotatable about the lens barrel unit body 216. A surface of the driven body 207 toward the drive unit 150 functions as a frictional sliding surface that is brought into pressure contact with the protrusions 138 of each vibrating body 100 provided in the drive unit 150 and receives a frictional driving force generated by elliptic motion excited in each protrusion 138. To this end, the frictional sliding surface of the driven body 207 is subjected to predetermined treatment so as to have abrasion resistance. For example, the driven body 207 is made of a stainless material, and has its frictional sliding surface subjected to hardening treatment by nitriding. The driven body 207 is drivingly rotated by a frictional driving force from the drive unit 150.

The output transmission member 209 is disposed on a surface of the driven body 207 on an opposite side from the frictional sliding surface thereof, in a manner sandwiching the rotor rubber 208 between itself and the driven body 207. The rotor rubber 208, which functions as a vibration-isolating rubber, suppresses transmission of unnecessary vibration from the driven body 207 to the output transmission member 209. The rotor rubber 208 is rotated along with the driven body 207 by a frictional force acting between the driven body 207 and the rotor rubber 208. Further, the output transmission member 209 is rotated in unison with the rotor rubber 208 by a frictional force acting between the rotor rubber 208 and the output transmission member 209.

The leaf spring 210, which is a pressure unit for pressing the drive unit 150 against the driven body 207, is disposed on an opposite side of the drive unit 150 from the driven body 207, in a manner sandwiching the drive unit 150 between itself and the driven body 207. The leaf spring 210 is sandwiched between the pressure ring 211 and the drive unit 150 so as to cause the leaf spring 210 to be compressed for generation of a pressure application force.

The lens barrel unit body 216 has a flange 216a protruding in a direction orthogonal to an optical axis L (radial direction). On a side of the flange 216a toward the drive unit 150, there is disposed the manual ring 215 which can be manually rotated so as to perform manual focusing. Disposed between the manual ring 215 and the output transmission member 209 is the roller ring 212 which can be rotated by transmission of a driving force (thrust) thereto from each of the manual ring 215 and the drive unit 150. The roller ring 212 is provided with the output key 217 and has a function of rotating a cam ring, not shown, and the like via the output key 217.

The roller ring 212 has the roller shafts 213 which are provided in plurality such that each of the roller shafts 213 protrudes in the direction orthogonal to the optical axis L (radial direction), and the rollers 214 are fitted on the respective roller shafts 213 such that each of the rollers 214 can rotate about an associated one of the roller shafts 213. The output transmission member 209 and the manual ring 215 are disposed in a manner stacked in the direction of the optical axis L with the rollers 214 sandwiched therebetween.

The pressure ring 211 has an inner periphery thereof screw-engaged or bayonet-engaged with the lens barrel unit body 216. The lens barrel unit 200 is constructed such that the pressure ring 211 is rotated to be moved in the direction of the optical axis L so as to compress the leaf spring 210, whereby the members ranging from the drive unit 150 to the manual ring 215 are pressed and held in a manner sandwiched between the leaf spring 210 and the flange 216a. The amount of bending of the leaf spring 210 is thus appropriately set, whereby an appropriate pressure application force is imparted between the drive unit 150 and the driven body 207.

When elliptic motion is excited in each of the protrusions 138 of the vibrating bodies 100 provided in the drive unit 150, the driven body 207 held in pressure contact with the protrusions 138 is frictionally driven, whereby the driven body 207, the rotor rubber 208, and the output transmission member 209 are rotated about the optical axis L. Each of the rollers 214 held in contact with the output transmission member 209 revolves about the optical axis L together with the roller ring 212 while rolling on a surface of the manual ring 215. This causes the output key 217 provided on the roller ring 212 to drivingly rotate the cam ring, not shown, and the like, whereby autofocus operation and the like are performed.

Figure 4A:
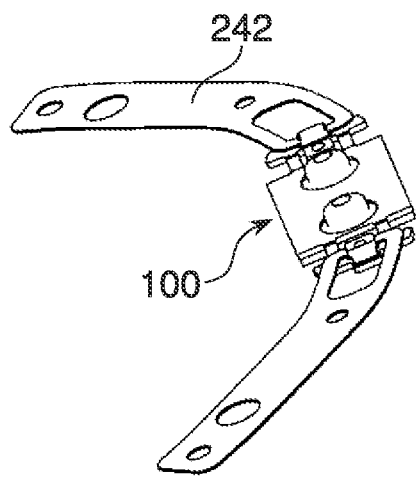
FIG. 4A is a perspective view of a structure in which are connected the vibrating body and support plates as components of the drive unit shown in FIG. 3B.
Figure 4B:
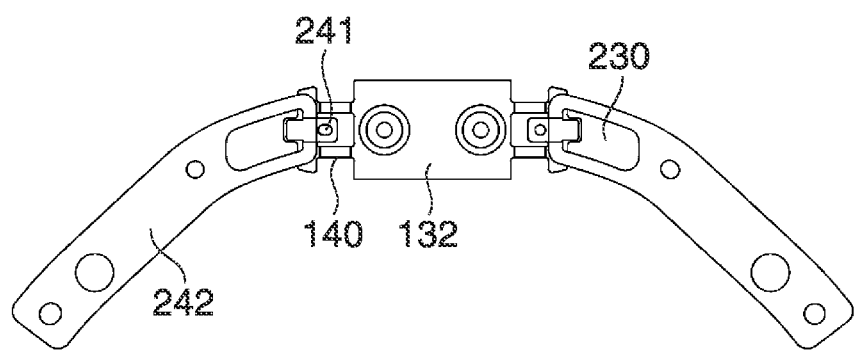
FIG. 4B is a top view of the structure in which are connected the vibrating body and the support plates, shown in FIG. 4A.
Figure 4C:
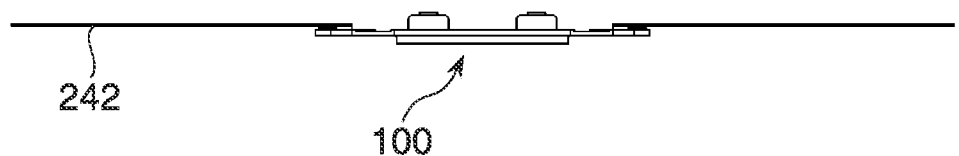
FIG. 4C is a side view of the structure in which are connected the vibrating body and the support plates, shown in FIG. 4A.

Next, the drive unit 150 will be described in detail. As shown in FIG. 3B, the drive unit 150 is comprised of the vibrating bodies 100, support plates 242, the base 243, felt members 244, and equalizing stages 245. FIGS. 4A to 4C are views of a structure in which are connected a vibrating body 100 and support plates 242 adjacent thereto.

The base 243 having an annular shape has three recesses formed for mounting therein the vibrating bodies 100, respectively, at equally-spaced intervals. Each of the three vibrating bodies 100 is mounted in a top of an associated one of the recesses such that a driving direction, i.e., the direction connecting between the two protrusions 138 of the vibrating body 100, coincides with a tangent direction of the base 243. What is meant by the driving direction coinciding with the tangent direction of the base 243 is that the direction connecting between the two protrusions 138 is parallel to a tangent line of a circle which is drawn by setting the center of the base 243 as its center and passes through a midpoint between the two protrusions 138. The parallelism between the driving direction and the tangent line is required to be within a predetermined allowable range, but it is not required that the driving direction and the tangent line be precisely parallel to each other. The associated equalizing stage 245 is mounted in a bottom of the recess, and the associated felt member 244 is disposed between the equalizing stage 245 and the vibrating body 100.

In the drive unit 150, the vibrating bodies 100 are held in contact with the respective felt members 244, the felt members 244 are held in contact with the respective equalizing stages 245, and the equalizing stages 245 are held in contact with the base 243. Therefore, even when an external force acts on the drive unit 150, e.g., due to falling of an image pickup apparatus provided with the lens barrel unit 200, each of the vibrating bodies 100 is supported by the associated felt member 244 and equalizing stage 245. This makes it possible to prevent the vibrating body 100 itself from being significantly warped, and thereby suppress separation between the elastic body 132 and the piezoelectric element 135. In short, each felt member 244 and the associated equalizing stage 245 function as a warpage suppression unit for suppressing warpage of the vibrating body 100 when an external force acts on the vibrating body 100.

The vibrating body 100 is required to be supported such that it is not moved even when it receives a reaction force from the driven body 207 during driving of the same. To this end, the elastic body 132 of the vibrating body 100 is integrally formed with support parts 140 made of the same material as that of the elastic body 132. Each of the support parts 140 is formed in a manner protruding from a location corresponding to the node of the vibration in the secondary out-of-plane vibration mode, i.e. the mode B, so as to minimize a hindrance to the vibration excited in the vibrating body 100. Accordingly, fixing of the vibrating body 100 with respect to the base 243 at the support parts 140 is performed at the location corresponding to the node of the vibration excited by the vibrating body 100, so as to minimize the hindrance to the vibration excited in the vibrating body 100.

Further, it is required to equalize the pressure application force applied from the vibrating body 100 to the driven body 207 (i.e., to make uniform the pressure application force applied to the driven body 207 by the two protrusions 138 of the vibrating body 100, and in turn apply the frictional driving force uniformly to the driven body 207). To this end, each of the support plates 242 is formed to have an arcuate shape elongated in the circumferential direction of the base 243 along the outer periphery of the lens barrel unit body 216 and a smaller thickness than that of the elastic body 132. Each support plate 242 is joined to an associated one of the opposite ends (support parts 140) of the elastic body 132 by laser welding or the like at joining part 241. Each support plate 242 has one end thereof fixed to an associated one of the support parts 140 and the other end thereof fixed to the base 243, e.g., with a screw 247 (see FIG. 3B).

Further, the support plate 242 is formed with a through hole 230 for reducing rigidity of the vibrating body 100 in a pressure application direction. Furthermore, the support plate 242 is designed such that a boundary between a joint and a non-joint portion thereof is positioned in the vicinity of the node of the support part 140 so as to join the support part 140 and the support plate 242 to each other at a location close to the node of vibration excited in the vibrating body 100. In the support plate 242, part of the non-joint portion is bent from the boundary between the joint and the non-joint portion so as to prevent noise from being generated by contact of the support plate 242 with the support part 140.

Figure 5A:
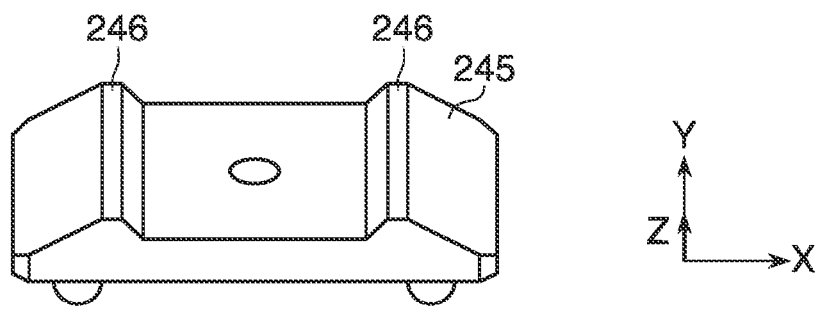
FIG. 5A is a perspective view of an equalizing stage as a component of the drive unit shown in FIG. 3B.
Figure 5B:
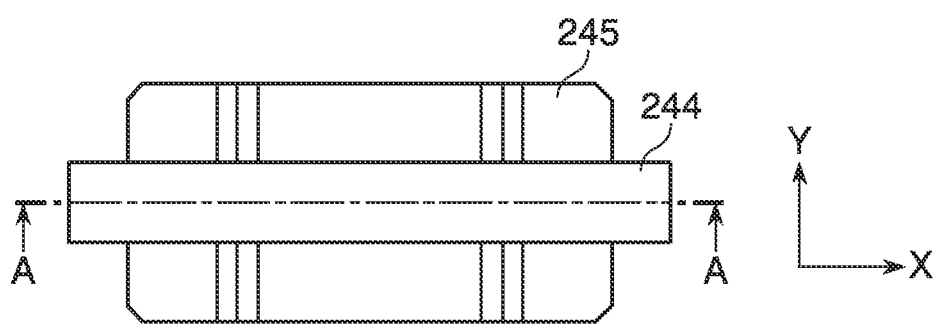
FIG. 5B is a top view of a felt member and the equalizing stage.
Figure 5C:
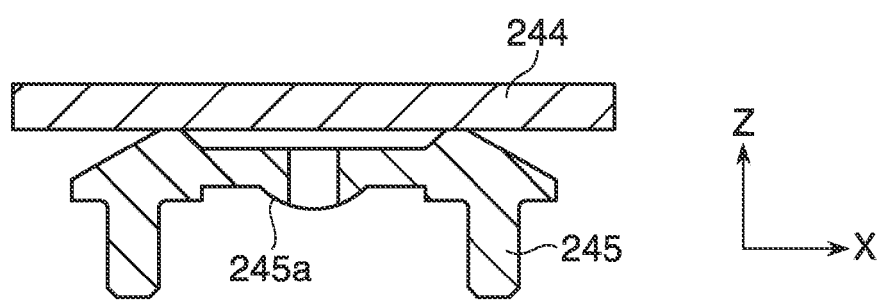
FIG. 5C is a cross-sectional view of the felt member and the equalizing stage.

In the following, a detailed description will be given of a configuration of the felt member 244 and the equalizing stage 245. FIG. 5A is a perspective view of the appearance of the equalizing stage 245, FIG. 5B is a top view of the felt member 244 and the equalizing stage 245, and FIG. 5C is a cross-sectional view taken along a line indicated by arrows A-A in FIG. 5B. As shown in FIGS. 5A to 5C, in a state where the felt member 244 and the equalizing stage 245 are mounted on the vibrating body 100, X, Y, and Z directions which coincide with the X, Y, and Z directions set with respect to the vibrating body 100, as shown in FIGS. 1A to 1C, respectively, are set with respect to the felt member 244 and the equalizing stage 245, and these directions are referred to in the following description on an as-needed basis.

The felt member 244 and the equalizing stage 245 are joined to each other using a double-sided tape or the like. The felt member 244 has a function of making it difficult for a low-frequency vibration, in particular, of vibration transmitted from the vibrating body 100 toward the base 243, to be transmitted via the equalizing stage 245 to components on the side of the base 243. In short, the felt member 244 is an example of a vibration damping member for damping a low-frequency vibration without damping a high-frequency vibration excited in the vibrating body 100. The vibration damping member may be formed e.g. of moltopren in place of felt.

In the present embodiment, the length of the felt member 244 in the Y direction is set to be shorter than that of the vibrating body 100 (elastic body 132). By thus making the end of the vibrating body 100 in the Y direction in a state out of contact with the felt member 244, it is possible to minimize hindrance to vibration excited in the vibrating body 100, and thereby improve driving efficiency.

The equalizing stage 245 has two protruding portions 246, each of which has a predetermined length in the Y direction, formed on a side thereof toward the vibrating body 100. Each of the protruding portions 246 is formed at a location corresponding to an associated one of the protrusions 138 of the vibrating body 100, i.e. at a location overlapping the protrusion 138 as viewed in the Z direction. The length of the protruding portion 246 in the X direction is set to be shorter than the outer diameter (length in the X direction) of the protrusion 138, and the protruding portion 246 is located in the vicinity of the node of the vibration in the secondary out-of-plane bending vibration mode (the mode B in FIG. 2B). This limits a contact range between the felt member 244 and the vibrating body 100 to a location close to the two nodes of the vibration in the mode B, so that hindrance to the vibration in the secondary out-of-plane bending vibration mode is made difficult by the equalizing stage 245, which makes it possible to improve driving efficiency.

As shown in FIG. 5C, the equalizing stage 245 has an equalizing portion 245*a* formed on a side thereof toward the base 243. The equalizing portion 245*a* has an arcuate shape, as viewed in the Y direction, and extends in the Y direction. The equalizing portion 245*a* is formed at an intermediate location in the X direction which corresponds to an intermediate point between the protrusions 138 of the vibrating body 100. Note that, as is apparent from FIG. 5A, the length of the equalizing portion 245*a* is set such that the equalizing portion 245*a* does not extend to lateral ends of the equalizing stage 245 in the Y direction. Since the equalizing stage 245 is formed with the equalizing portion 245*a*, the attitude of the vibrating body 100 can be adjusted in the X direction, whereby it is possible to equalize (make uniform) a pressure application force applied by the two protrusions 138 to the driven body 207.

Figure 6:
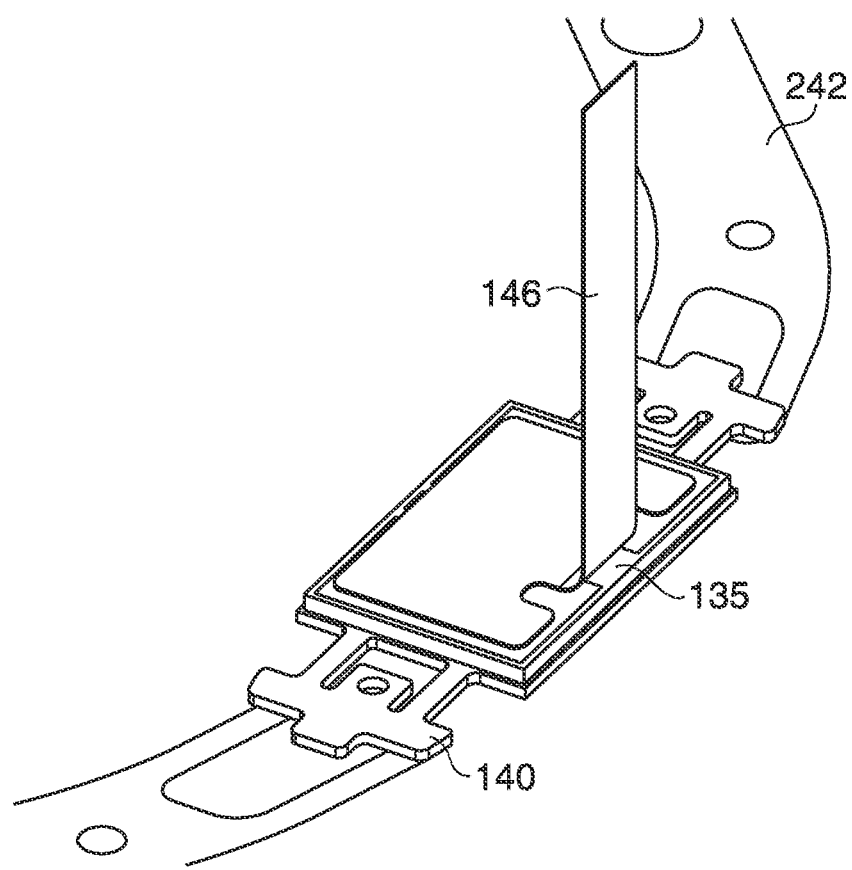
FIG. 6 is a perspective view useful in explaining how a flexible printed circuit board is disposed with respect to a piezoelectric element as a component of the vibrating body shown in FIGS. 1A to 1C.

Incidentally, since the length in the Y direction of the felt member 244 is made shorter than that of the vibrating body 100 as mentioned above, gaps are formed between the vibrating body 100 and the equalizing stage 245. In the present embodiment, the FPC 146 for supplying electric power to the piezoelectric element 135 is disposed by making use of one of the gaps. FIG. 6 is a perspective view useful in explaining how the FPC 146 is disposed. The FPC 146 and the piezoelectric element 135 are bonded to each other such that boundaries between bonded portions and non-bonded portions are located close to the nodes of the vibrating body 100, respectively, and the FPC 146 is drawn out from a radially outer peripheral side of the base 243. This makes it possible to reduce a footprint of the FPC 146 on the base 243 toward radially outer peripheral side thereof, to thereby reduce the size of the lens barrel unit 200.

Next, a description will be given of an image pickup apparatus and a microscope provided with an X-Y stage, as respective examples of an apparatus to which is applied the above-described drive unit 150 and an apparatus to which a variation of the drive unit 150 is applied. Although not shown, a variation of the drive unit 150 is a drive unit configured to linearly move a driven body in the X direction connecting between the two protrusions 138 of the vibrating body 100.

Figure 7A:
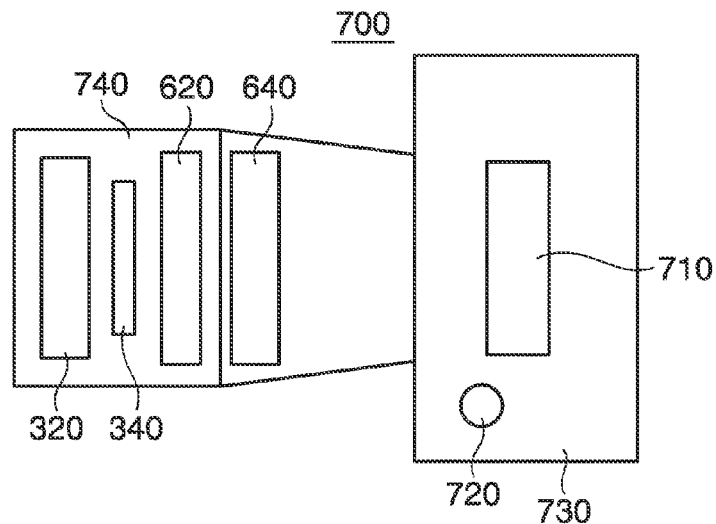
FIG. 7A is a schematic top view of an image pickup apparatus provided with the lens barrel unit (drive unit) shown in FIG. 3A.

FIG. 7A is a schematic top view of the image pickup apparatus, denoted by reference numeral 700. The image pickup apparatus 700 includes a camera body 730 having an image pickup element 710 and a power button 720 mounted thereon. Further, the image pickup apparatus 700 has a lens barrel 740 including a first lens group 310 (see FIG. 7B), a second lens group 320, a third lens group 330 (see FIG. 7B), a fourth lens group 340, and vibration drive devices 620 and 640. The lens barrel 740 is an interchangeable lens which can replace another, and hence a lens barrel 740 suited to an object to be photographed can be mounted on the camera body 730. In the image pickup apparatus 700, the second lens group 320 and the fourth lens group 340 are driven by the respective vibration drive devices 620 and 640. The lens barrel unit 200 described with reference to FIGS. 3A and 3B can be used as each of the vibration drive devices 620 and 640.

Figure 7B:
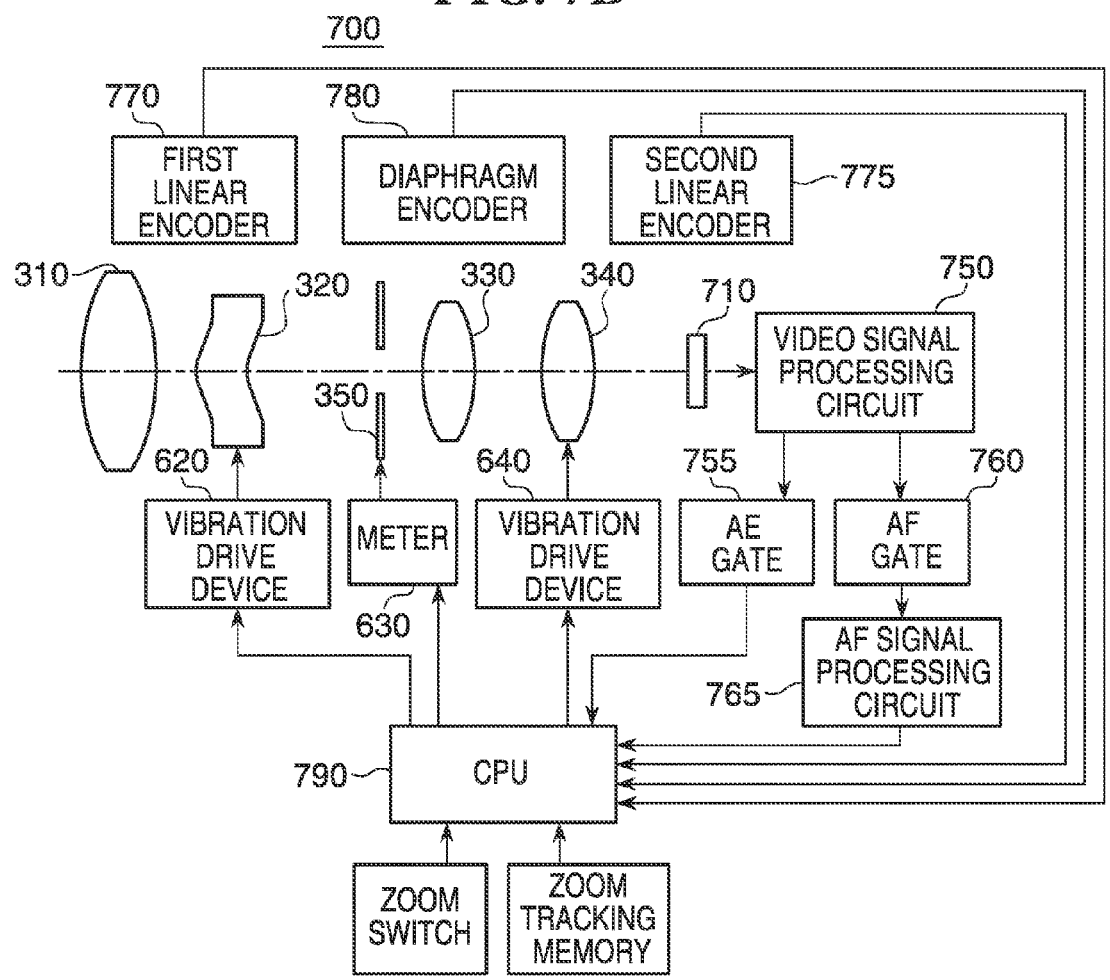
FIG. 7B is a block diagram of a control system of the image pickup apparatus shown in FIG. 7A.

FIG. 7B is a block diagram of a control system of the image pickup apparatus 700. The first lens group 310, the second lens group 320, the third lens group 330, the fourth lens group 340, and a light amount adjustment unit 350 are disposed at respective predetermined locations on an optical axis in the lens barrel 740. Light having passed through the first to fourth lens groups 310 to 340 and the light amount adjustment unit 350 forms an optical image on the image pickup element 710. The image pickup element 710 converts the optical image to an electric signal and then outputs the electric signal. The electric signal is sent to a video signal processing circuit 750.

The video signal processing circuit 750 performs amplification, gamma processing, and so forth, on the output signal from the image pickup element 710. The video signal processing circuit 750 is connected to a CPU 790 not only via an AE gate 755, but also via an AF gate 760 and an AF signal processing circuit 765. The video signal having undergone predetermined processing in the video signal processing circuit 750 is sent to the CPU 790, through the AE gate 755, and the AF gate 760 and the AF signal processing circuit 765. Note that the AF signal processing circuit 765 extracts high-frequency components from the video signal to generate an evaluation value signal for autofocus (AF), and delivers the generated evaluation value signal to the CPU 790.

The CPU 790, which is a control circuit for controlling the overall operation of the image pickup apparatus 700, generates control signals for exposure determination and focusing from the acquired video signal. The CPU 790 adjusts the positions of the second lens group 320, the fourth lens group 340, and the light amount adjustment unit 350 in the direction of the optical axis by controlling driving of the vibration drive devices 620 and 640 and a meter 630, so as to obtain determined exposure and an appropriate focus state. Under the control of the CPU 790, the vibration drive device 620 moves the second lens group 320 in the direction of the optical axis, and the vibration drive device 640 moves the fourth lens group 340 in the direction of the optical axis. The light amount adjustment unit 350 is drivingly controlled by the meter 630.

The position, in the direction of the optical axis, of the second lens group 320 driven by the vibration drive device 620 is detected by a first linear encoder 770 and then a result of the detection is sent to the CPU 790, whereby it is fed back to driving of the vibration drive device 620. Similarly, the position, in the direction of the optical axis, of the fourth lens group 340 driven by the vibration drive device 640 is detected by a second linear encoder 775 and then a result of the detection is sent to the CPU 790, whereby it is fed back to driving of the vibration drive device 640. The position, in the direction of the optical axis, of the light amount adjustment unit 350 is detected by a diaphragm encoder 780 and then a result of the detection is sent to the CPU 790, whereby it is fed back to driving of the meter 630.

When the lens barrel unit 200 is used for moving a predetermined lens group of the image pickup apparatus 700 in the direction of the optical axis, a large retaining force is maintained even in a state where the lens group is stopped. This makes it possible to suppress occurrence of deviation of the lens group even when an external force is applied to the lens barrel or the image pickup apparatus body.

Although the above description is given of an example in which a lens group is moved in the direction of the optical axis using the annular drive unit 150, a configuration of moving a lens group in the direction of the optical axis using the vibrating body 100 is not limited to this. For example, the vibrating body 100 is capable of moving a driven body in the X direction connecting between the two protrusions. Therefore, a configuration can be envisaged in which a holding member holding a lens is set as the driven body, and a single or a plurality of vibrating bodies 100 are held on a holding base member such that an optical axis direction of the lens, a driven direction of the driven body, and the X direction of the vibrating body 100 become parallel to each other. In this case, by disposing the felt member 244 and the equalizing stage 245 between the vibrating body 100 and the holding base member, it is possible to obtain the same advantageous effects as provided by the drive unit 150.

Further, in a case where a lens for camera shake correction is provided in a lens barrel, it is possible to use the vibrating body 100 in a camera shake correction unit for moving the lens for camera shake correction in a desired direction within a plane orthogonal to an optical axis. In this case, a lens holding member for holding the lens for camera shake correction is used as a driven body, and a single or a plurality of vibrating bodies 100 for driving the lens holding member in two directions orthogonal to each other on the plane orthogonal to the optical axis are disposed so as to make it possible to move the lens holding member in the directions. In doing this, by using a configuration in which the felt member 244 and the equalizing stage 245 are disposed between each of the vibrating bodies 100 and a holding base member for holding the vibrating bodies 100, it is possible to obtain the same advantageous effects as provided by the drive unit 150. Note that the camera shake correction unit may be configured such that instead of driving the lens for camera shake correction, the image pickup element 710 incorporated in the image pickup apparatus body is moved in a desired direction within the plane orthogonal to the optical axis.

Figure 8:
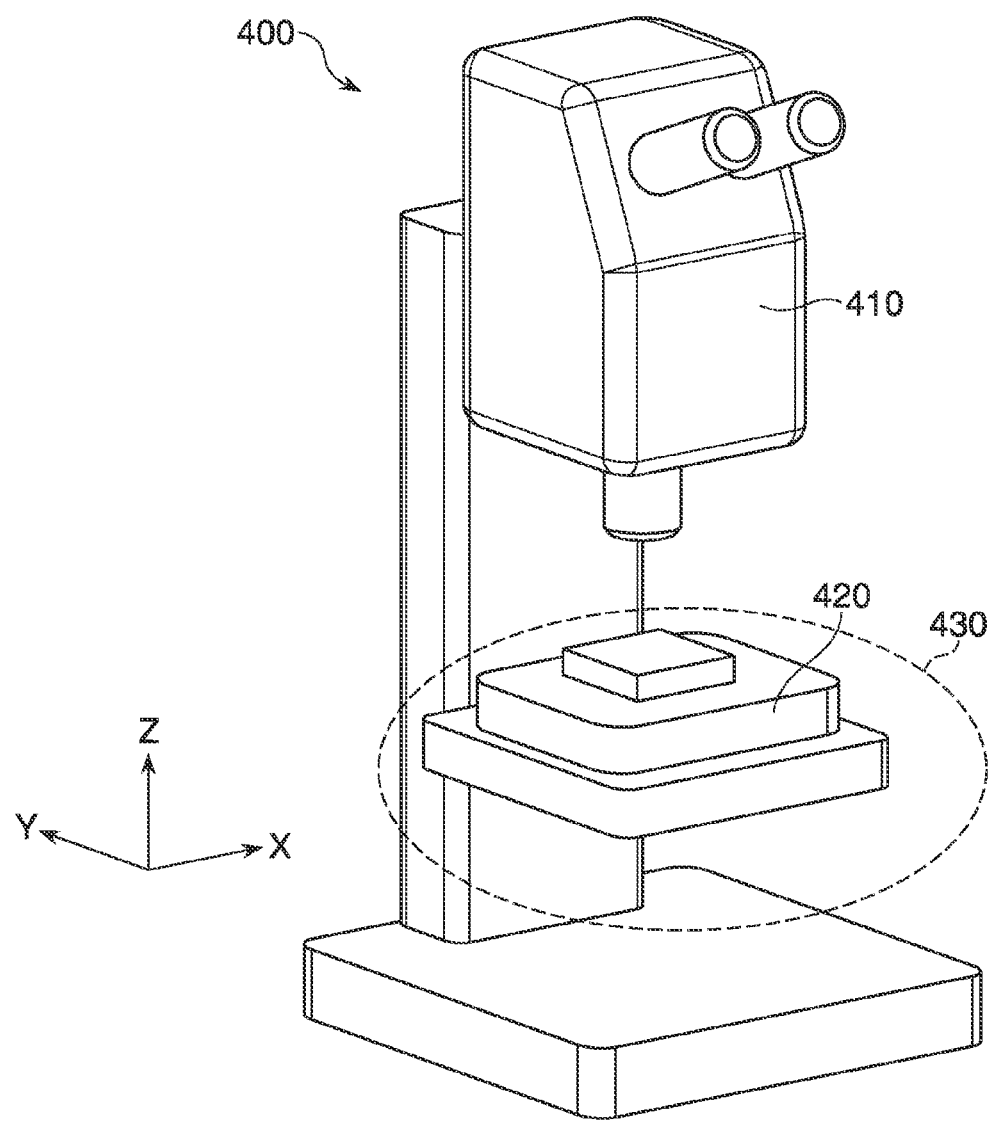
FIG. 8 is a perspective view of the appearance of a microscope provided with an X-Y stage on which is installed the vibration drive device according to the embodiment.

FIG. 8 is a perspective view of the appearance of the microscope, which is denoted here by reference numeral 400. The microscope 400 is comprised of an image pickup section 410 incorporating an image pickup element and an optical system, and an automatic stage 430, as an example of a stage device having a stage that is provided on a base and is moved within an X-Y plane by a vibration drive device.

In the microscope 400, at least two vibration drive devices are used each of which has the vibrating body 100 held on a holding base member, and the felt member 244 and the equalizing stage 245 disposed between the vibrating body 100 and the holding base member. At least one of the vibration drive devices is used for driving in the X direction and is disposed such that the X direction of the vibrating body 100 coincides with that of the stage 420, and at least another one of the vibration drive devices is used for driving in the Y direction and is disposed such that the X direction of the vibrating body 100 coincides with the Y direction of the stage 420.

An object to be observed is placed on an upper surface of the stage 420, and an enlarged image is picked up by the image pickup section 410. When an observation range is large, the stage 420 is moved in the X or Y direction within the plane by driving the automatic stage 430 to move the object to be observed, whereby a large number of photographic images of the object are obtained. Then, the photographic images are combined through image processing by a computer, not shown, whereby a high-definition image can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-220203 filed Oct. 29, 2014 which is hereby incorporated by reference herein in its entirety.

What is claimed is:

1. A vibration drive device that comprises a vibrating body including an electromechanical energy conversion element and an elastic body having a first surface to which the electromechanical energy conversion element is joined and a second surface opposite from the first surface, on which protrusions are provided, and a driven body in pressure contact with the protrusions, and is configured to excite vibration in the vibrating body to thereby effect relative movement between the vibrating body and the driven body, the vibration drive device comprising:
an equalizing stage disposed on a side facing the first surface of the elastic body; and
a vibration damping member disposed between the vibrating body and said equalizing stage and configured to suppress transmission of vibration of the vibrating body to said equalizing stage,
wherein said equalizing stage receives a pressure application force applied to the vibrating body via said vibration damping member, and thereby equalizes a pressure application force applied from the vibrating body to the driven body,
wherein a length of a region of said vibration damping member in contact with the vibrating body is shorter than a length of the vibrating body in a direction orthogonal to a driving direction in which the vibrating body and the driven body are moved relative to each other, and also to a pressure application direction between the vibrating body and the driven body,
wherein said equalizing stage includes protruding portions in contact with said vibration damping member at respective locations overlapping the protrusions as viewed in the pressure application direction,
wherein an upper surface, facing the vibrating body, of each of the protruding portions has a first predetermined length in the driving direction and a second predetermined length in a direction orthogonal to the driving direction and the pressure application direction, and the predetermined length in the driving direction is shorter than the second predetermined length in the orthogonal direction, and
wherein a length of the upper surface in the driving direction is shorter than a length of each of the protrusions in the driving direction.

2. The vibration drive device according to claim 1, wherein said vibration damping member damps a low-frequency vibration excited in the vibrating body without damping a high-frequency vibration excited in the vibrating body.

3. The vibration drive device according to claim 1, wherein said vibration damping member is made of felt or moltopren.

4. The vibration drive device according to claim 1, wherein by applying a predetermined alternating current (AC) voltage to the electromechanical energy conversion element, elliptic motion within a plane including the pressure application direction and the driving direction is excited in each protrusion of the vibrating body.

5. The vibration drive device according to claim 4, wherein the elliptic motion is generated by simultaneously exciting two different out-of-plane bending vibrations in the vibrating body.

6. The vibration drive device according to claim 5, wherein the two different out-of-plane bending vibrations are primary and secondary vibrations whose nodal lines are orthogonal to each other, and
wherein in the vibrating body, each protrusion is provided close to a location corresponding to a loop of the primary out-of-plane bending vibration, and also to a location corresponding to a node of the secondary out-of-plane bending vibration.

7. The vibration drive device according to claim 1, further comprising a base having a recess,
wherein said equalizing stage is disposed in a bottom of the recess, and
wherein said vibration damping member is disposed between the vibrating body and said equalizing stage in the recess.

8. The vibration drive device according to claim 7, wherein said base has an annular shape, and
wherein the vibrating body is disposed such that the driving direction coincides with a tangent direction of said base, so as to drivingly rotate the driven body.

9. The vibration drive device according to claim 1, further comprising support plates configured to support the elastic body,
wherein each support plate has a thickness smaller than a thickness of the elastic body, and is joined to an associated one of opposite ends of the vibrating body in the driving direction,
wherein in each support plate, a boundary between a joint portion thereof with the elastic body and a non-joint portion thereof is located close to a location corresponding to the node of the vibration excited in the vibrating body, and
wherein in each support plate, the non-joint portion has one portion thereof bent from the boundary so as to avoid being brought into contact with the elastic body.

10. The vibration drive device according to claim 9, wherein each support plate is formed with a through-hole for reducing rigidity in the pressure application direction.

11. The vibration drive device according to claim 9, wherein each support plate has an arcuate shape.

12. A lens barrel comprising:
a lens; and
the vibration drive device according to claim 1, for moving said lens.

13. An image pickup apparatus comprising:
a lens barrel;
an image pickup element for converting an optical image formed by light passing through said lens barrel; and
the vibration drive device according to claim 1 for moving a lens disposed in said lens barrel.

14. A stage device comprising:
a stage; and
the vibration drive device according to claim 1 for moving said stage within a plane of said stage.

15. The vibration drive device according to claim 1, wherein gaps are formed between the vibrating body and said equalizing stage.

16. The vibration drive device according to claim 15, further comprising a flexible printed circuit board,
wherein the flexible printed circuit board has bonded portions that are bonded to the electromechanical energy conversion element, and non-bonded portions that are not bonded to the electromechanical energy conversion element, and
wherein a part of the non-bonded portions is disposed at the gaps.

17. A vibration drive device that comprises a vibrating body including an electromechanical energy conversion element and an elastic body on which protrusions are provided, and a driven body in contact with the protrusions, the vibration drive device comprising:
an equalizing stage; and
a vibration damping member disposed between the vibrating body and the equalizing stage,
wherein the equalizing stage receives a pressure application force applied to the vibrating body via the vibration damping member, and thereby equalizes a pressure application force applied from the vibrating body to the driven body,
wherein a length of a region of the vibration damping member in contact with the vibrating body is shorter than a length of the vibrating body in a direction orthogonal to a driving direction in which the vibrating body and the driven body are moved relative to each other, and also to a pressure application direction between the vibrating body and the driven body, and
wherein the equalizing stage includes protruding portions in contact with the vibration damping member at respective locations overlapping the protrusions as viewed in the pressure application direction.

18. The vibration drive device according to claim 17, wherein a top surface of each of the protruding portions has a predetermined length in the driving direction, the predetermined length being shorter than a length of each of the protrusions in the driving direction.

19. The vibration drive device according to claim 17, wherein a top surface of each of the protruding portions has a first predetermined length in the driving direction and a second predetermined length in a direction orthogonal to the driving direction and the pressure application direction, and the first predetermined length is shorter than the second predetermined length.

20. A drive unit comprising:
a base having at least one recess; and
the vibration drive device according to claim 17,
wherein the vibration drive device is disposed in the recess.

21. The drive unit according to claim 20, wherein the base has an annular shape, and
wherein the vibrating body is disposed such that the driving direction is configured to be along a tangent direction of the base, so as to drivingly rotate the driven body.

22. A lens barrel comprising:
a lens; and
the vibration drive device according to claim 17, for moving the lens.

23. An image pickup apparatus comprising:
a lens barrel;
an image pickup element for converting an optical image formed by light passing through the lens barrel; and
the vibration drive device according to claim 17 for moving a lens disposed in the lens barrel.

24. A stage device comprising:
a stage; and the vibration drive device according to claim 17 for moving the stage within a plane of the stage.

* * * * *